Feb. 21, 1933.  W. F. NEWHOUSE  1,898,205
BASKET HANDLE MACHINE
Filed Nov. 13, 1931    9 Sheets-Sheet 1
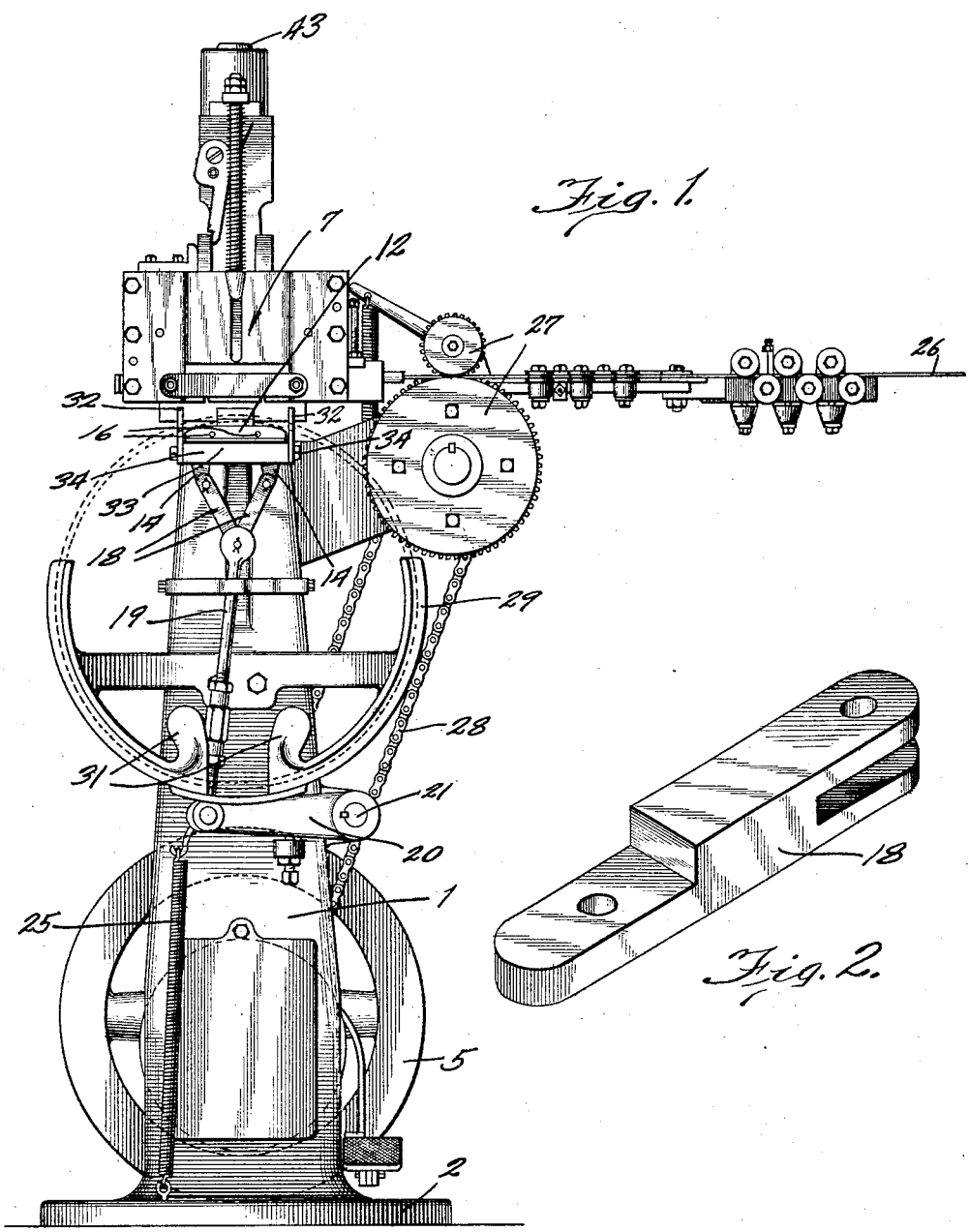

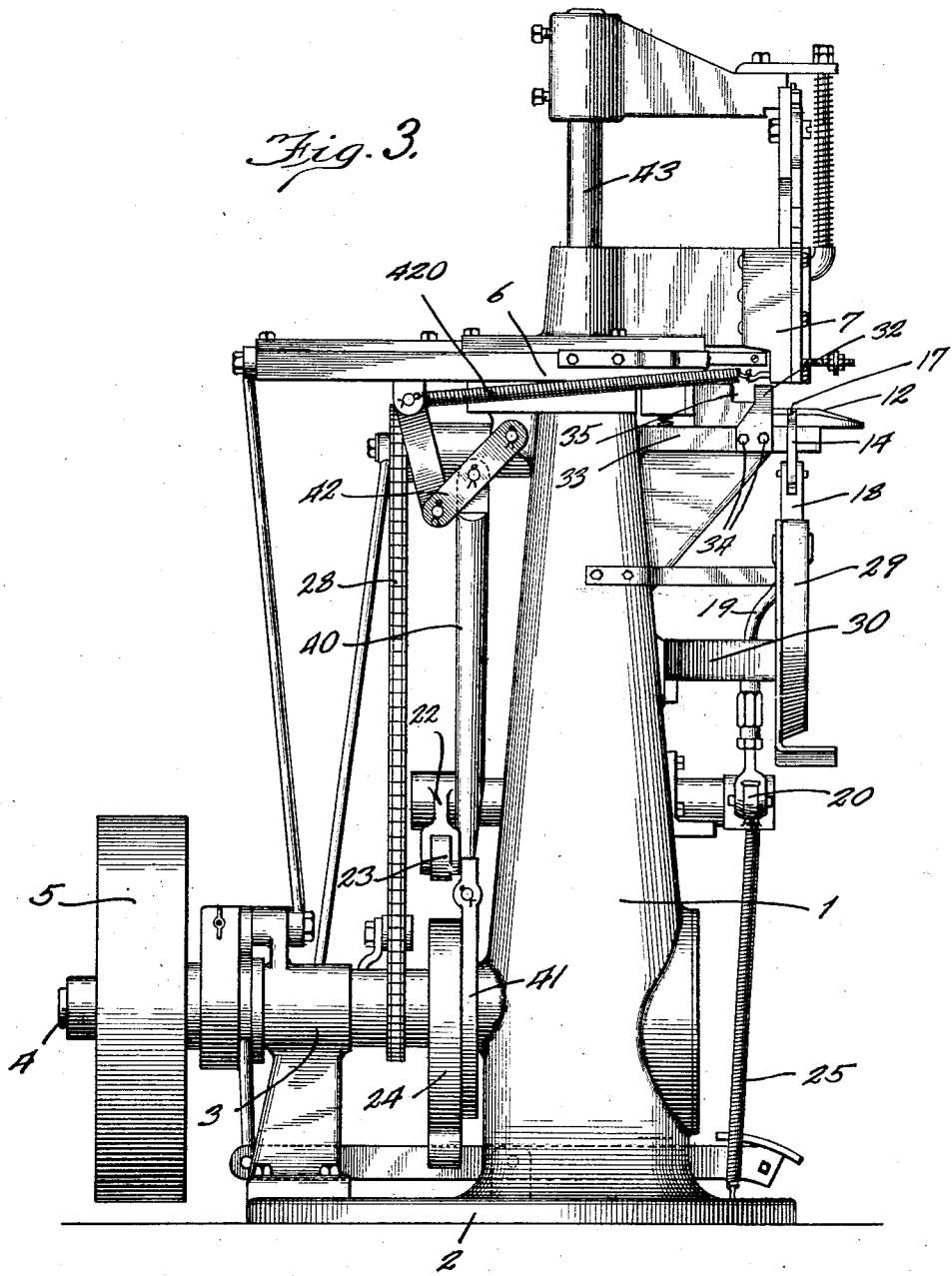

Feb. 21, 1933.  W. F. NEWHOUSE  1,898,205
BASKET HANDLE MACHINE
Filed Nov. 13, 1931    9 Sheets-Sheet 3

Inventor:
Walter F. Newhouse
By Arthur F. Durand
Atty.

Feb. 21, 1933.   W. F. NEWHOUSE   1,898,205
BASKET HANDLE MACHINE
Filed Nov. 13, 1931    9 Sheets-Sheet 6

Inventor:
Walter F. Newhouse
By Arthur H. Durand
Atty.

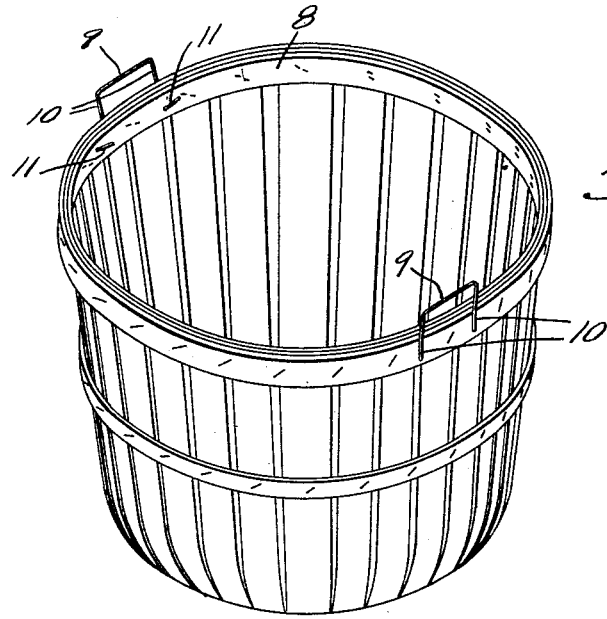
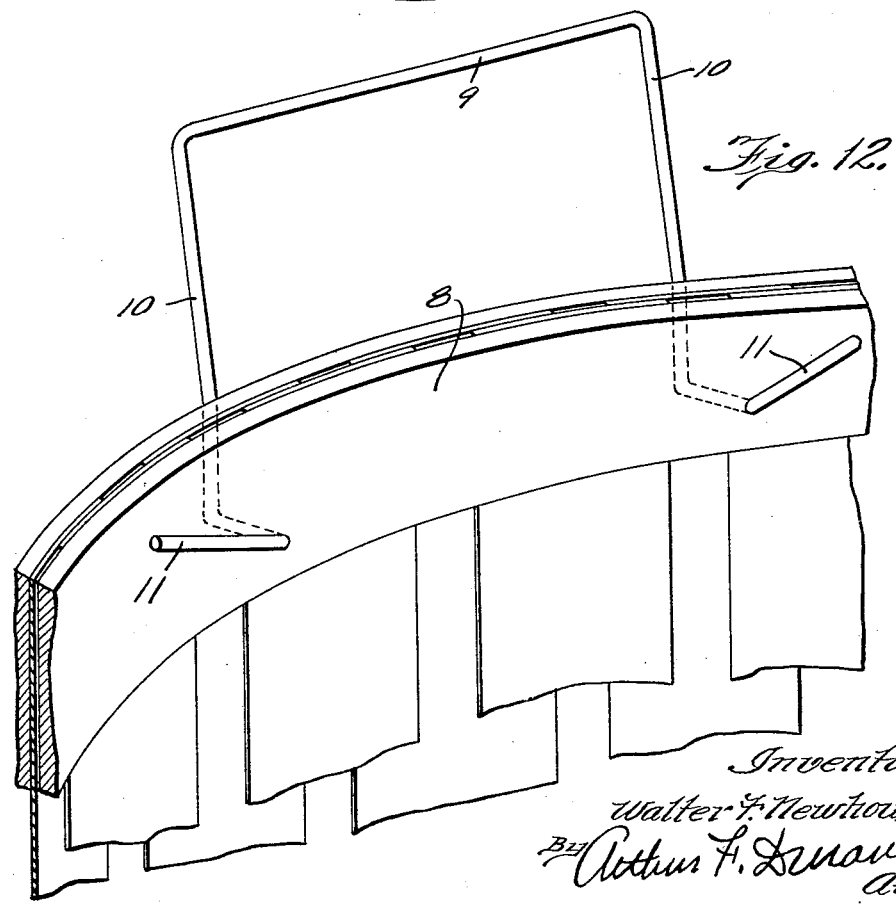

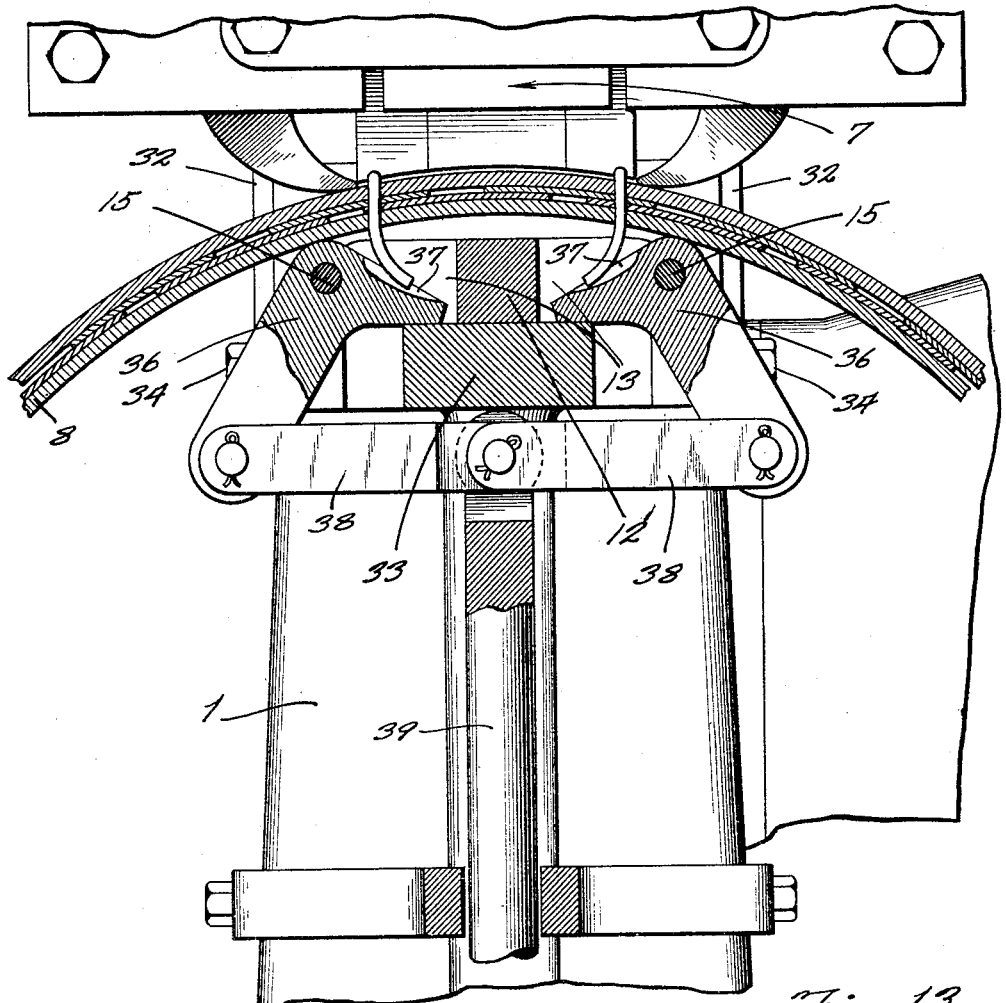
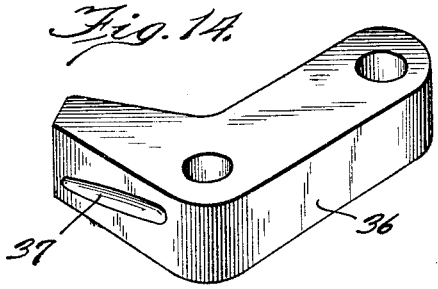

Patented Feb. 21, 1933

1,898,205

UNITED STATES PATENT OFFICE

WALTER F. NEWHOUSE, OF BENTON HARBOR, MICHIGAN

BASKET HANDLE MACHINE

Application filed November 13, 1931. Serial No. 574,738.

This invention relates to machinery for making and attaching wire handles for baskets.

Generally stated, the object of the invention is to provide a novel and improved mechanism for bending the two inner ends of the wire handle against the inside hoop of the basket, such as a bushel or half-bushel basket, so that these ends will be more or less horizontal when the basket is right side up, in order to provide the basket with a handle having certain advantages, as will hereinafter more fully appear.

It is also an object to provide certain details and features of construction and combinations tending to increase the general efficiency and the desirability of a basket handle making and attaching machine of this particular character.

To the foregoing and other useful ends, the invention consists in matters hereinafter set forth and claimed, and shown in the accompanying drawings in which—

Fig. 1 is a front elevation of a basket handle machine embodying the principles of the invention.

Fig. 2 is a perspective of one of the parts of said machine.

Fig. 3 is a side elevation of said machine.

Fig. 11 is a perspective of a basket provided with handles of the kind that are made and inserted by the said machine.

Fig. 12 is an enlarged fragmentary perspective of said handle and adjacent portion of the basket.

Fig. 13 is a fragmentary sectional view showing another form of the invention.

Fig. 14 is a perspective of one of the clinch blocks shown in Fig. 13.

Figure 4:
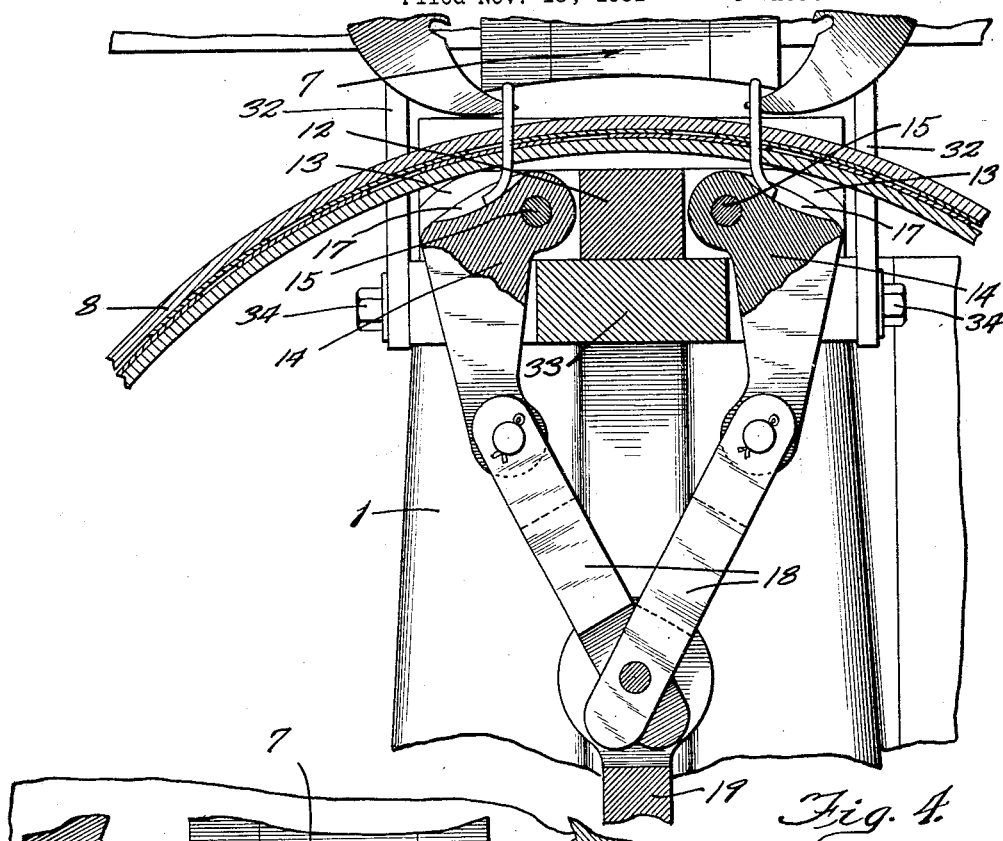
Fig. 4 is a detail sectional view of said machine, showing the parts in certain positions.

As thus illustrated, the invention comprises an upright body or pedestal 1 provided with a base 2 adapted to rest on the floor. Said base has a bracket bearing 3 secured thereto, and the main driving shaft 4 is supported in said bearing and in the bearing provided by the said pedestal. A pulley 5 is secured to said shaft to furnish power thereto for operating the machine.

At its top, the pedestal 1 is provided with mechanism 6 for forming the wire into bail shape, and with mechanism 7 for then bending the two ends of the bail-shaped member at right angles and inserting these bent end portions through the rim 8 of the basket, so that the transverse portion 9 and the parallel portions 10 of the handle will be in position outside of the basket. See Figs. 11 and 12 of the drawings. The mechanism 6, and the mechanism 7, are old and well-known, and are operated by well-known means from the shaft 4 previously mentioned, and do not require further explanation.

Figure 5:
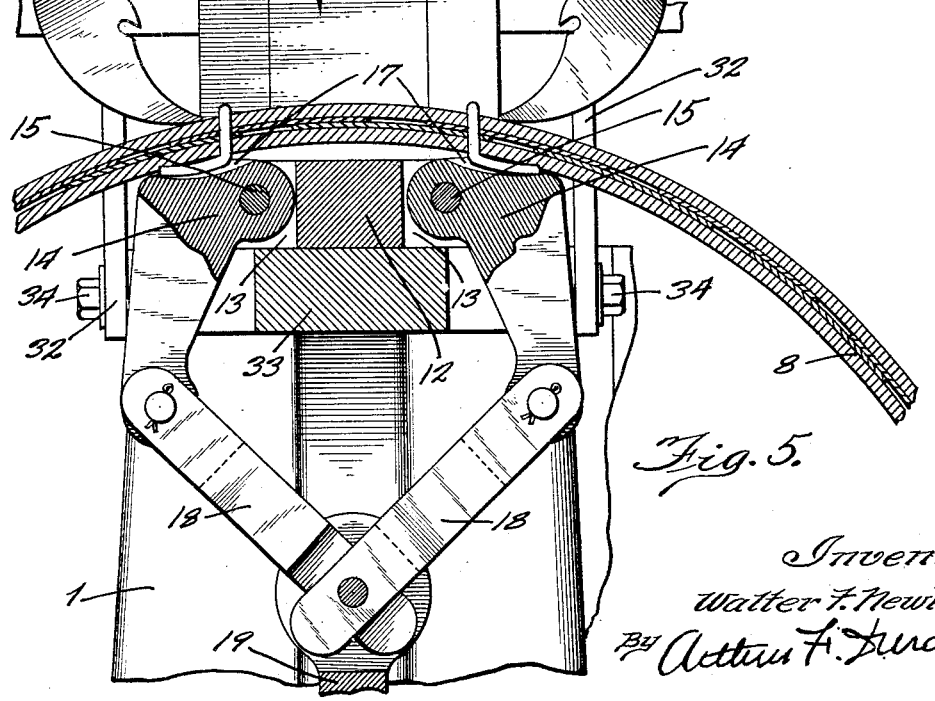
Fig. 5 is a similar view showing the parts in different positions.
Figure 6:
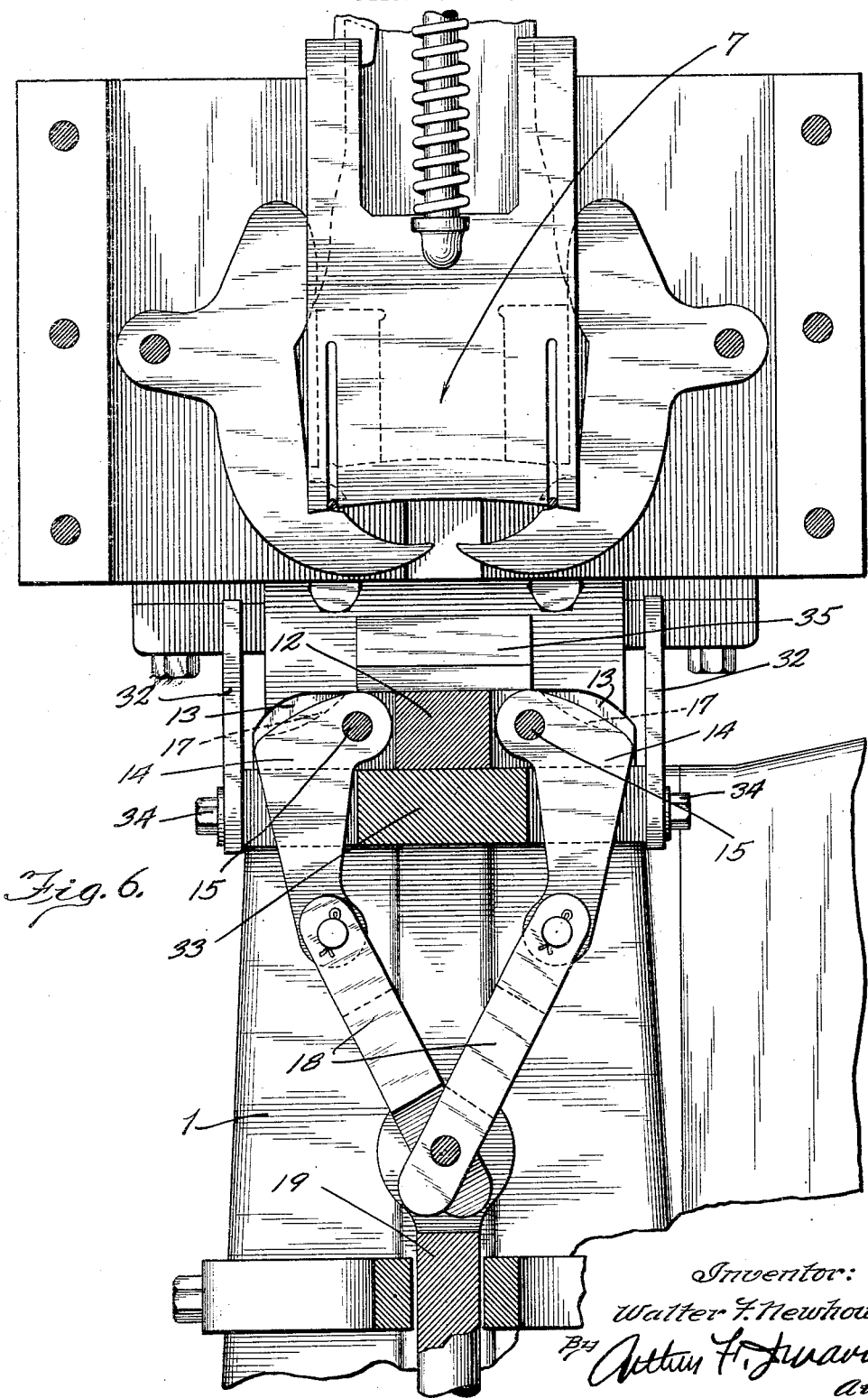
Fig. 6 is a similar view showing additional portions of the machine, with the parts in the same position in which they are shown in Fig. 4.
Figure 7:
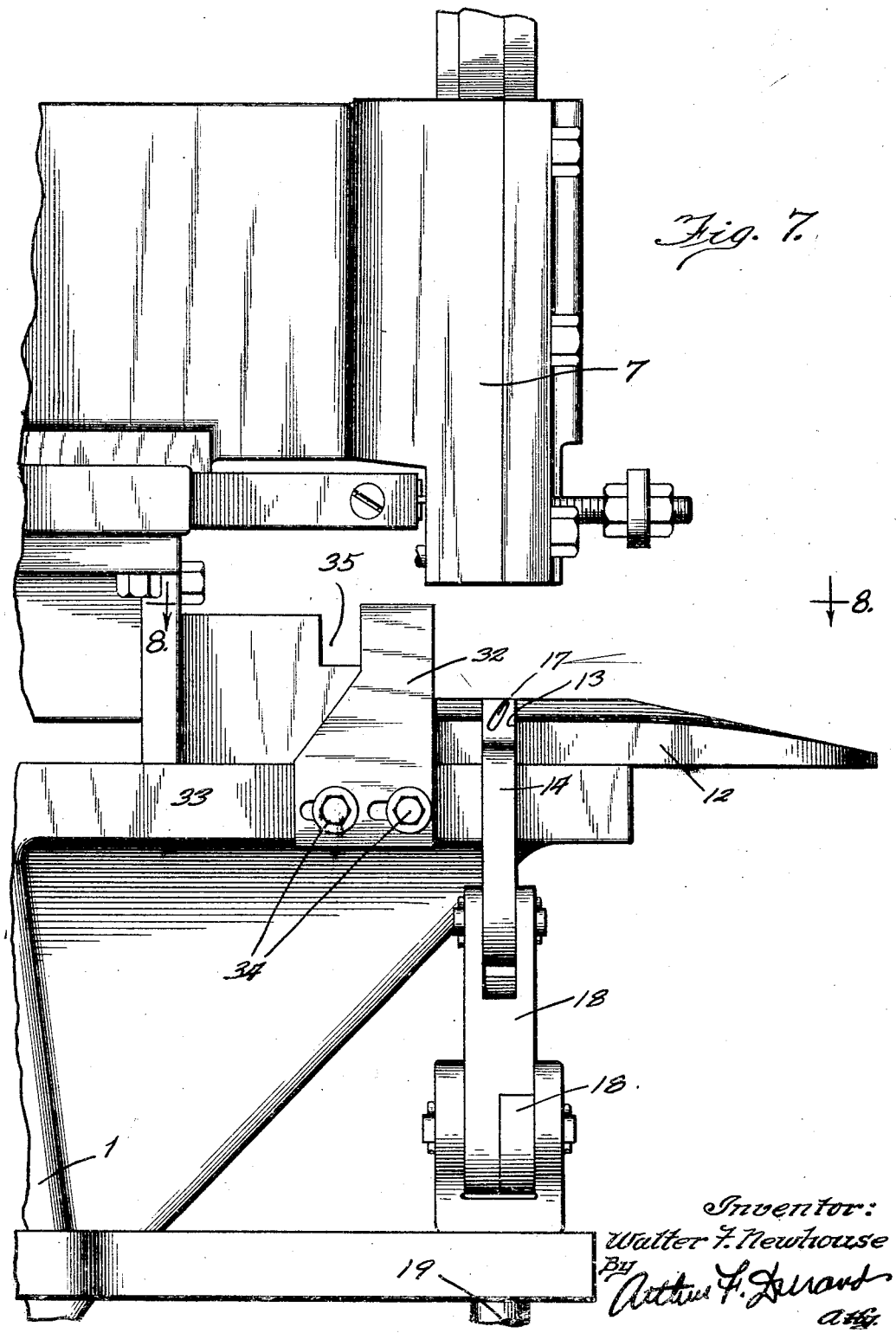
Fig. 7 is an enlarged side elevation of certain portions of said machine.
Figure 8:
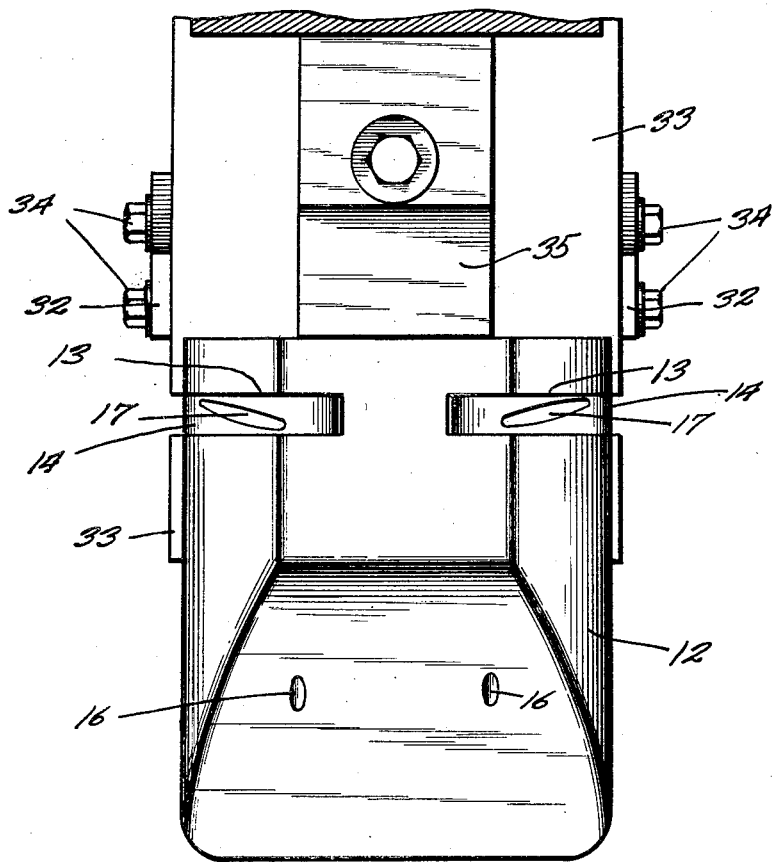
Fig. 8 is a horizontal section on line 8—8 in Fig. 7.
Figure 9:
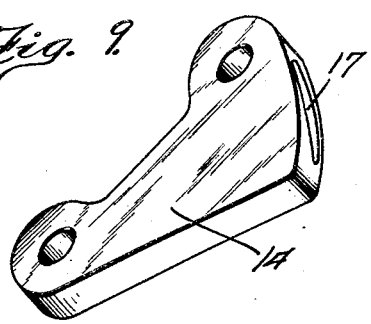
Figs. 9 and 10 are perspectives of certain elements of the machine.
Figure 10:
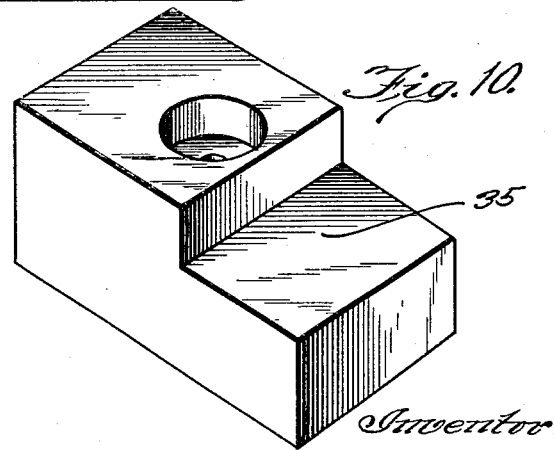

The mechanism for clinching or bending the end portions 11 of the handle against the inside hoop of the basket rim, and the means for operating this mechanism, constitute the invention in this case, and are as follows:

Referring to Figs. 7 and 8, it will be seen that the front of the machine is provided with a basket support 12 upon which one side of the basket is supported while the wire handle is being attached thereto. This support is provided with slots 13, and the clinch blocks 14 are pivoted therein, by pins 15 inserted horizontally in the openings 16 formed in said basket support. Each clinch block is provided with a groove 17 to receive the end portions of the wire handle, and the lower ends of said clinch blocks are connected by links 18 with a vertically reciprocating rod or pitman 19, which latter is in turn connected to a crank arm 20 on the shaft 21, the latter being supported in bearings on the pedestal 1, and having its rear end provided with an arm 22 provided with a roller 23 for engagement with the cam 24 on the shaft 4 previously mentioned. A spring 25 is hitched to the end of the arm 20, at one end, and has its other end hitched to the base 2, in the manner shown, whereby this spring tends to maintain the clinch blocks 14 in their normal positions, as shown in Figs. 4 and 6 of the drawings. However, the operation of the clinch blocks is so timed, relatively to the formation and insertion of the wire handle in the basket, that the ends of the handle are clinched by the actuation of the clinch blocks, as shown in Fig. 5 of the drawings, by the upward movement of the pitman 19, and the consequent toggle action of the links 18 previously mentioned. It will be seen that the grooves 17 are disposed at angles to cause the end portions 11 of the handle to extend slightly upward, when the basket is right side up. But if desired the end portions 11 of the handle may be exactly horizontal, and the clinch blocks may be formed to so bend them, without departing from the spirit of the invention.

It will be understood, of course, that the object of bending the inner end portions of the handle in this manner is to provide a handle that can be bent outwardly and then back again, as in securing a basket cover in place, without rocking the inner end portions in a manner that would injure or disturb the fruit in the basket.

The wire 26 from which the handles are made is fed to the handle forming mechanism 6 by any suitable means, such for example as the feed rolls 27 shown in Fig. 1 of the drawings, these rolls being operated by a sprocket chain 28 having sprocket connection with the shaft 4 previously mentioned.

It will also be seen that a circular basket support 29 is provided, supported by a bracket 30 at the front of the machine, this support having space between the portions 31 thereof, as shown in Fig. 1 of the drawings, to receive the first handle, when the second handle is being inserted. It will be seen that one handle is applied, at one side of the basket, and that the basket is then turned around to bring its opposite side into position to have the second handle attached thereto. The formation of the support 29, and of the previously mentioned support 12, is such that the basket is accurately presented to the handle forming and attaching devices.

It will be seen that the support 12 is also provided with a stop or gauge 32 adjustably held in place on the bracket arm 33 of the pedestal by means of bolts 34, whereby the position of the basket is accurately predetermined. It will be seen that while the end portions of the handle are being clinched, in the manner previously explained, the transverse portion 9 of the handle will rest in the space 35 back of the stop or gauge 32.

Figure 15:
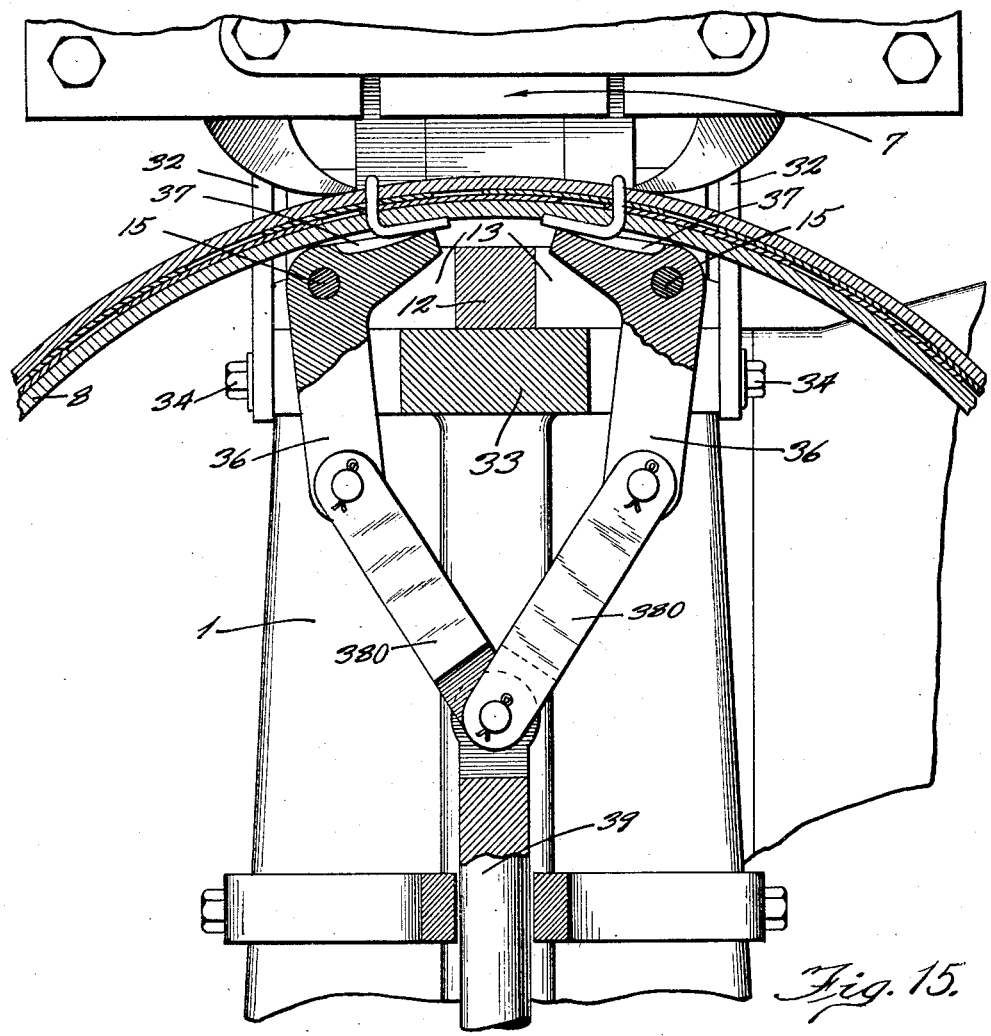
Fig. 15 is a view similar to Fig. 13, showing the parts in different positions.
Figure 16:
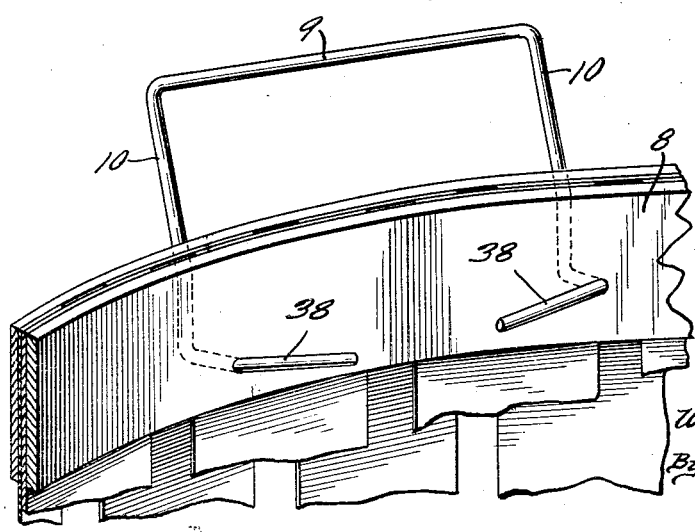
Fig. 16 is a perspective of the form of handle made by the structure shown in Figs. 13 and 15, together with the adjacent portion of the basket.

Figs. 13 to 16 illustrate another form of the invention. In this case, the clinch blocks 36 are pivoted in position, similarly to the clinch blocks previously described, but it will be seen that these clinch blocks 36 are differently formed, and that they have grooves 37 for engaging the end portions 38 of the handle, to bend these end portions in the manner shown in Fig. 16 of the drawings. In other words, in this case the end portions of the handle are bent toward each other, instead of away from each other, and to operate these clinch blocks they are connected by links 380 with the rod 39, and in this case it is the downward movement of the rod 39 that causes the actuation of the clinch blocks from their normal position, as shown in Fig. 13 of the drawings, into their operative position, as shown in Fig. 15 of the drawings. With this form of the invention, therefore, the ends of the wire handle are bent laterally, but they are bent toward each other, in the manner shown.

In either form of the invention, it will be seen, pivoted clinch blocks are provided which are operative at a position inside the basket during the operation of clinching or bending the inner ends of the wire handle. These clinch blocks, in either form of the invention, operate about parallel and horizontal axes extending parallel with the axis of the basket. In this way the handles are inserted and attached in a manner to provide inside end portions that are of the desired character, the ends when bent in this manner, as previously explained, being stationary or practically stationary, within the basket, when the top of the handle is bent outward and then back again, as in attaching the basket cover. At the same time, the clinch block mechanism is effective to clinch the ends of the handle in a manner to prevent the handle from being accidentally pulled out, or from being loosened in the basket.

As shown and described, any suitable means can be employed for operating the bail-forming mechanism 6, such as the rod 40 extending between the eccentric device 41 on the shaft 4 and the toggle device 42 above, the actuation of this toggle device by the rod 40, and by the spring 420, serving to operate the bail-forming mechanism 6, in the well-known manner.

To operate the handle end bending and inserting mechanism 7, the usual and well-known vertically reciprocating rod or member 43 is provided, extending downwardly within the pedestal 1 to suitable operating means therein on the shaft 4, all of which is well-known and does not require further explanation.

It will be seen that in either form of the invention the clinch blocks, while in normal position, are operative to partially deflect the handle ends laterally, whereby a partial clinching of the handle ends is accomplished while the clinch blocks are in their normal or stationary positions. Thereafter, said clinch blocks, either 14 or 36, are operative to complete the clinching of the handle ends against the inner side of the basket rim.

In both forms of the invention, the clinch blocks have motion in opposite direction, in a common plane transverse to the axis of the basket, and hence in each form of the invention the handle ends are bent in opposite directions.

What I claim as my invention is:

1. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally in opposite directions against the rim of the basket, and instrumentalities for causing the operation of said mechanism in properly timed relation to the insertion of the handle through the rim of the basket.

2. A structure as specified in claim 1, said clinch blocks being pivoted to operate about parallel axes extending parallel with the axis of the basket, and said instrumentalities comprising means connecting said clinch blocks together to cause the operation thereof in unison.

3. A structure as specified in claim 1, said mechanism being disposed in position to enter the basket and clinch the handle ends against the inner side of the basket rim.

4. A structure as specified in claim 1, said supporting means comprising a member disposed in position to enter the basket and support the upper side thereof, whereby the handle is applied while the axis of the basket is horizontal, and said clinch blocks being disposed in slots formed in said member, whereby each clinch block is movable in a common vertical plane in said member, and said instrumentalities comprising a lower driving shaft and power transmitting connections therefrom to said clinch blocks, operative to cause said movement of the clinch blocks, whereby the handle ends are clinched against the inner side of the basket rim.

5. A structure as specified in claim 1, said clinch blocks being pivoted to move up and down about horizontal parallel axes extending parallel with the axis of the basket, and said instrumentalities comprising toggle links connecting said clinch blocks together, and including a vertically reciprocating member connected to the toggle joint formed by said links, whereby the clinch blocks are oscillated in unison to clinch the handle ends against the inner side of the basket rim.

6. A structure as specified in claim 1, said supporting means comprising a member disposed in position to enter the basket and support the upper side thereof, wherein the clinch blocks have motion simultaneously in opposite directions, and including means for engaging and steadying the lower side of the basket, during the handle-applying operation, and said instrumentalities comprising a vertically reciprocating member disposed back of said steadying means.

7. A structure as specified in claim 1, said clinch blocks being disposed in position to partially deflect the handle ends while said blocks are in their normal positions, during the insertion of the handle, and being operative about parallel axes after such partial deflection to complete the clinching of the handle ends.

8. A structure as specified in claim 1, said clinch blocks each having a deflecting groove in the face thereof, each groove being disposed in position to receive one of the handle ends, and being shaped to partially deflect the handle end laterally while the block is in the normal position thereof, and said clinch blocks being operative about parallel axes after such partial deflection to then bend the handle ends against the inner side of the basket rim.

9. A structure as specified in claim 1, said clinch blocks each having a deflecting groove in the face thereof, each groove being disposed in position to receive one of the handle ends, and being shaped to partially deflect the handle end laterally while the block is in the normal position thereof, and said clinch blocks being operative after such partial deflection to then bend the handle ends against the inner side of the basket rim, said blocks being oscillatory in opposite directions about parallel axes extending parallel with the axis of the basket.

10. A structure as specified in claim 1, said supporting means comprising a member disposed in position to enter the basket and support the upper side thereof, said clinch blocks being pivoted in slots in said member, which slots are located in a common plane extending transverse to the axis of the basket, and adjustable gauging means on said member to engage the edge of the basket rim, thereby to accurately position the basket on said member to receive the handle.

11. A structure as specified in claim 1, said instrumentalities comprising a lower driving shaft, a rock shaft, a cam on said driving shaft, means on said rock shaft to engage said cam, thereby to oscillate said rock shaft, an arm on said rock shaft, and means including a toggle for connecting said arm with said clinch blocks.

12. A structure as specified in claim 1, said clinch blocks being disposed in position and operative in opposite directions to deflect the handle ends toward each other against the inner side of the basket rim.

13. A structure as specified in claim 1, said clinch blocks having normal positions operative to partially deflect the handle ends toward each other, and being operative in opposite directions after said partial deflection to complete the clinching of the handle ends toward each other against the inner hoop of the basket rim.

14. A structure as specified in claim 1, said clinch blocks having normal positions operative to partially deflect the handle ends toward each other, and being operative after said partial deflection to complete the clinching of the handle ends toward each other against the inner hoop of the basket rim, and said instrumentalities comprising a toggle connection between said clinch blocks, and including a member connected to the toggle and movable downwardly by power to operate said clinch blocks from their normal to their operative positions.

15. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally against the rim of the basket, whereby these deflected end portions will extend more or less horizontally when the basket is right side up, and instrumentalities for causing the operation of said mechanism in properly timed relation to the insertion of the handle through the rim of the basket, said clinch blocks being pivoted to operate about parallel axes extending parallel with the axis of the basket, and said instrumentalities comprising means connecting said clinch blocks together to cause the operation thereof in unison.

16. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally against the rim of the basket, whereby these deflected end portions will extend more or less horizontally when the basket is right side up, and instrumentalities for causing the operation of said mechanism in properly timed relation to the insertion of the handle through the rim of the basket, said mechanism being disposed in position to enter the basket and clinch the handle ends against the inner side of the basket rim.

17. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally against the rim of the basket, whereby these deflected end portions will extend more or less horizontally when the basket is right side up and instrumentalities for causing the operation of said mechanism in properly timed relation to the insertion of the handle through the rim of the basket, said clinch blocks being pivoted to move up and down about horizontal parallel axes extending parallel with the axis of the basket, and said instrumentalities comprising toggle links connecting said clinch blocks together, and including a vertically reciprocating member connected to the toggle joint formed by said links, whereby the clinch blocks are oscillated in unison to clinch the handle ends against the inner side of the basket rim.

18. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally against the rim of the basket, whereby these deflected end portions will extend more or less horizontally when the basket is right side up, and instrumentalities for causing the operation of said mechanism in properly timed relation to the insertion of the handle through the rim of the basket, said clinch blocks each having a deflecting groove in the face thereof, each groove being disposed in position to receive one of the handle ends, and being shaped to partially deflect the handle end laterally while the block is in the normal position thereof, and said clinch blocks being operative after such partial deflection to then bend the handle ends against the inner side of the basket rim, said blocks being oscillatory in opposite directions about parallel axes extending parallel with the axis of the basket.

19. In a machine for bending wire into bail-shaped form, inserting the end portions of the bail through the rim of the basket, and clinching the ends of the bail, the combination of means for supporting the basket in position to receive the said handle, mechanism comprising clinch blocks for deflecting the end portions of the handle laterally against the rim of the basket, whereby these deflected end portions will extend more or less horizontally when the basket is right side up, and instrumentalities for causing the operation of said mechanism in properly timed relation to the insertion of the handle through the rim of the basket, said clinch blocks having normal positions operative to partially deflect the handle ends toward each other, and being operative after said partial deflection to complete the clinching of the handle ends toward each other against the inner hoop of the basket rim, and said instrumentalities comprising a toggle connection between said clinch blocks, and including a member connected to the toggle and movable downwardly by power to operate said clinch blocks from their normal to their operative positions.

Specification signed this third day of November, 1931.

WALTER F. NEWHOUSE.